United States Patent Office 2,853,467
Patented Sept. 23, 1958

2,853,467

LIQUID AROMATIC DIAMINES AS CURING AGENTS FOR EPOXY ETHER RESINS

Albert Bloom, Summit, and Eldred V. Welch, North Plainfield, N. J., assignors to General Aniline & Film Corporation, New York, N. Y., a corporation of Delaware No Drawing. Application January 4, 1956
Serial No. 557,237

12 Claims. (Cl. 260—47)

The present invention relates to epoxy ether resins, and particularly, to liquid mixtures of aromatic diamines as curing agents for said resins.

It is known that epoxy ether resins are useful in the manufacture of varnishes, enamels, molding compositions, adhesives, films, fibers, molded articles, and the like. In order to cure or harden such epoxy ether resins and compositions containing them, various types of curing agents have been proposed, such as alkalies, sodium or potassium hydroxide, alkaliphenoxides like sodium phenoxides; carboxylic acids or anhydrides such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate, and the like.

In addition to the foregoing curing agents various amines and diamines have been proposed, such as, for example, triethylamine, ethylene diamine, diethyl amine, diethylene triamine, triethylene tetramine, pyridine, piperidine, dicyandiamide, m-phenylenediamine, diacetone diamine, triethanol amine, di-n-propylamine, di-isopropylamine, methyl di-isopropylamine, di-isobutylamine, ethylcyclohexylamine, o-tolylnaphthylamine, N,N'-diethyl ethylene diamine, N,N-diethyl-1,3,-propane diamine, and the like.

These various curing agents, including those referred to above, are mixed with the epoxy resin or the epoxy resin composition in order to effect the curing thereof, the amounts varying considerably depending upon the particular resin or resin composition and curing agent employed.

Of all the foregoing hardening agents, m-phenylenediamine is currently preferred as the hardener or curing catalyst for epoxy resins for certain applications because of its distinct advantage of producing a cured resin or composition of high heat distortion resistance. This compound in substantially pure form, however, suffers the disadvantage of being a relatively high melting material, melting at approximately 60°–63° C. When used in commercial practice, it is necessary either to melt the m-phenylenediamine and mix it with the epoxy resin to be hardened or to heat the epoxy resin above the melting point of the m-phenylenediamine, add the curing agent and stir until dissolved and mixed. Such a mixture will react at room temperature to form a hard resin representing a "B" stage resin. Under the influence of heat which may range anywhere from one-half to four hours at about 150° C. a complete cure of the epoxy resin is achieved.

Since m-phenylenediamine is a solid and difficult to incorporate into the epoxy resin, whether the resin be a liquid at room temperature or liquefied by the application of heat and since it is necessary to blend the m-phenylenediamine with the resin at the melting point of the m-phenylenediamine which in the commercial grade may range anywhere from approximately 60 to 63° C., this blending operation is very hazardous and in many instances a highly exothermic reaction has been set off under this condition. The high temperature required to melt the m-phenylenediamine results in a relatively high temperature of the potting liquid thereby shortening the pot life of the resin.

In view of the foregoing shortcomings, attempts have been made to employ liquid amines as curing agents which would produce cured epoxy resins of high heat distortion resistance, but without success.

All of the aforementioned primary and secondary aliphatic and aromatic amines and diamines with the exception of m-phenylenediamine, whether used singly or as mixtures, give a cured epoxy resin which has a low temperature distortion point.

It is an object of the present invention to provide a mixture of aromatic diamines that are liquid at room temperature and when employed as curing agents for epoxy resins yield a cured resin having a high temperature distortion point.

Other objects and advantages will become more apparent from the following specification.

We have found that blends of two aromatic diamines, each of which contains a minimum of two aromatic amino groups in the aromatic molecule, yield high temperature distortion when employed as curing agents for epoxy resins. Inasmuch as such blend or mixture is liquid it is immediately adaptable for mixing with epoxy resin at ordinary temperature. Moreover, such blend or mixture prolongs the working life of the resulting epoxy resin composition because of the lower mixing temperature. By the use of such blend, the desired properties of m-phenylenediamine are achieved while avoiding the above disadvantages and prolonging the working life of the epoxy resin.

From the results obtained during the course of our experimentation with the curing of epoxy resin we have found that the reason for the failure of the previously suggested aliphatic and aromatic primary and secondary amines, either alone or in admixture, to yield cured resins having a high temperature distortion point, is that they do not have the desired structure. Accordingly, in order to attain the foregoing objects it is absolutely essential that in the blend the two aromatic diamines each contain a minimum of two aromatic amino groups in the aromatic nucleus constituting the aromatic molecule.

The aromatic diamines utilized in preparing liquid blends in accordance with the present invention have the following general formulae:

(a)

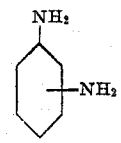

The aromatic diamine characterized by (a) consists of o-, m-, and p-phenylenediamines.

(b)

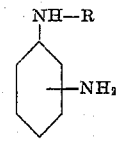

wherein R represents an alkyl group of 1 to 5 carbon atoms, e. g. methyl, ethyl, propyl, isopropyl, butyl, isobutyl, amyl, etc.

As illustrative examples of diamines characterized by (b) the following may be mentioned:

N-methyl-o-phenylenediamine
N-methyl-m-phenylenediamine

N-methyl-p-phenylenediamine
N-ethyl-o-phenylenediamine
N-ethyl-m-phenylenediamine The liquid curing agents of the present invention are particularly adaptable for the curing of epoxy ether resins characterized by the following general formula:

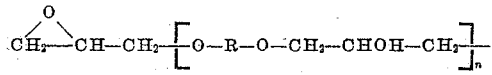

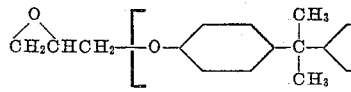

N-ethyl-p-phenylenediamine
N-propyl-o-phenylenediamine
N-propyl-m-phenylenediamine
N-propyl-p-phenylenediamine
N-isopropyl-o-phenylenediamine
N-isopropyl-m-phenylenediamine
N-isopropyl-p-phenylenediamine
N-butyl-o-phenylenediamine
N-butyl-m-phenylenediamine
N-butyl-p-phenylenediamine
N-isobutyl-o-phenylenediamine
N-isobutyl-m-phenylenediamine
N-isobutyl-p-phenylenediamine
N-sec.butyl-o-phenylenediamine
N-sec.butyl-m-phenylenediamine
N-sec.butyl-p-phenylenediamine
N-tert.butyl-o-phenylenediamine
N-tert.butyl-m-phenylenediamine
N-tert.butyl-p-phenylenediamine
N-amyl-o-phenylenediamine
N-amyl-m-phenylenediamine
N-amyl-p-phenylenediamine
N-isoamyl-o-phenylenediamine
N-isoamyl-m-phenylenediamine
N-isoamyl-p-phenylenediamine
N-β-methyl-n-butyl-o-phenylenediamine
N-β-methyl-n-butyl-m-phenylenediamine
N-β-methyl-n-butyl-p-phenylenediamine
N-sec.amyl-o-phenylenediamine
N-sec.amyl-m-phenylenediamine
N-sec.amyl-p-phenylenediamine
N-tert.amyl-o-phenylenediamine
N-tert.amyl-m-phenylenediamine
N-tert.amyl-p-phenylenediamine
N-α-ethyl-n-propyl-o-phenylenediamine
N-α-ethyl-n-propyl-m-phenylenediamine
N-α-ethyl-n-propyl-p-phenylenediamine (c)

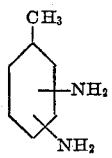

For the various toluenediamines represented by Formula c the following are illustrative:

2,3-toluenediamine
2,4-toluenediamine
2,5-toluenediamine
2,6-toluenediamine
3,4-toluenediamine
3,5-toluenediamine (d)

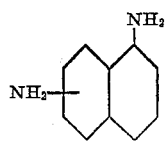

As for the various diaminonaphthalene characterized by Formula d, these include:

1,5-diaminonaphthalene
1,6-diaminonaphthalene
1,7-diaminonaphthalene
1,8-diaminonaphthalene wherein R represents the divalent hydrocarbon radical of a dihydric phenol and $n$ represents the extent of copolymerization. The epoxy ether resins have an epoxide equivalent which ranges from 140 to 4000. By the term "epoxide equivalent" is meant the grams of the polymeric material or resin containing one gram equivalent of epoxide.

The liquid epoxy ethers are obtained by the procedures described in United States Patents 2,500,600; 2,633,458; 2,642,412; 2,324,483; 2,444,333; 2,520,145; 2,521,911 and 2,651,589; all of which are incorporated herein by reference for examples of the types of epoxy ether resins that may be employed for curing with our liquid catalysts.

Of the several types epoxy ether resins with varying epoxide equivalents, we prefer to employ those having an epoxide equivalent ranging between 140–165 and 225–290, preferably between 190–210 because of its low melting point of 8°–12° C. (as determined by Durran's mercury method) and ease of formulation with the liquid catalysts.

We have found that a mixture which is liquid at room temperature is formed when 5% to 85% by weight of either o-, m-, or p-phenylenediamine and 95% to 15% by weight of any one of the foregoing N-alkyl-o-phenylenediamines characterized by Formula b are combined, and the resulting mixture heated in any suitable container to 90°–100° C. During heating the mixture is stirred, and the heating continued until a uniform melt is obtained. The time required to obtain a uniform melt, i. e. in liquid state may range from 5 minutes to two hours. The liquid mixture is then cooled, filtered, if necessary, after which it is ready for use as a curing agent.

The mixture of N-alkyl-o-phenylenediamine characterized by Formula b and of toluenediamines characterized by Formula c may range from 95% to 15% of b and 5% to 85% by weight of c. A mixture of any one of the phenylenediamines characterized by Formula a and any one of the toluenediamines characterized by Formula c may be readily prepared by blending 50% to 85% by weight of any one of the phenylenediamines and 50% to 15% by weight of toluenediamines. It is to be noted that in case the toluenediamines characterized by Formula c are a mixture of 2,3-, 2,4-, 2,5- etc. toluenediamines, it is desirable that the proportions of any one of the phenylenediamines range from 35% to 85% by weight, and the mixture of toluenediamines range from 65% to 15% by weight. When employing any one of the phenylenediamines with diamino naphthalene, the ratio of the phenylenediamines may range from 35% to 75% by weight and the diamino naphthalenes from 65% to 25% by weight.

Inasmuch as some diamino naphthalenes sold in commerce may consist of mixtures such as 1,5-, 1,6-, 1,7-, 1,8-, etc., it is preferable when using such mixtures that any one of the phenylenediamines with the mixture of the diamino naphthalenes range from 80% to 5% by weight and the diamino naphthalene range from 20% to 95% by weight.

Various blends of o-, m-, and p-phenylenediamines with N-alkyl phenylenediamines, diamino naphthalene and toluenediamines were prepared by employing the aforestated temperatures. After cooling and filtration, the blends remain liquid. Some of the various blends so prepared are shown in the following table:

TABLE 1

| Liquid mixture of diamines: | Parts by weight |
|---|---|
| m-Phenylenediamine | 55% to 85% |
| 2,4-toluenediamine | 45% to 15% |
| | |
| m-Phenylenediamine | 5% to 85% |
| N-methyl-o-phenylenediamine | 95% to 15% |
| | |
| m-Phenylenediamine | 5% to 85% |
| N-methyl-p-phenylenediamine | 95% to 15% |
| | |
| o-Phenylenediamine | 5% to 50% |
| N-methyl-o-phenylenediamine | 95% to 50% |
| | |
| p-Phenylenediamine | 5% to 25% |
| N-methyl-p-phenylenediamine | 95% to 75% |
| | |
| m-Phenylenediamine | 5% to 80% |
| Mixed diaminonaphthalenes resulting from dinitration of naphthalene and subsequent reduction | 95% to 20% |
| | |
| m-Phenylenediamine | 35% to 85% |
| Mixed toluenediamines resulting from dinitration of toluene and subsequent reduction | 65% to 15% |

The following examples will illustrate the application of the blend of diamines and the results obtained therefrom as curing agents for epoxy resins. All parts given are by weight.

*Example I*

47 parts of o-phenylenediamine and 53 parts of N-methyl-p-phenylenediamine were heated to 80° C. to give a liquid melt. After cooling, 2.88 parts were mixed with 18.5 parts of a liquid epoxy resin having an epoxide equivalent of 190–210 and the mixture heated at 100° C. for 3 hours. After cooling the cured resin showed a Barcol hardness of 42. The same resin cured with straight o-phenylenediamine had a Barcol hardness of 41. The significance of Barcol hardness and method of determining is described by J. H. Hruska, Iron Age 152, No. 16, 84–7 (1943).

*Example II*

3.2 parts of the liquid mixture formed from 50 parts of m-phenylenediamine and 50 parts of diaminonaphthalene was used to cure 18.5 parts of an epoxy resin having an epoxy equivalent of 190–210 at 100° C. for 3 hours. The cured resin showed a Barcol hardness of 41. The same resin cured with straight diaminonaphthalene had a Barcol hardness of 42.

*Example III*

2.8 parts of the liquid resulting from the mixture of 68 parts of m-phenylenediamine and 32 parts of 2,4-toluenediamine was used to cure 18.5 parts of epoxy resin having an epoxy equivalent of 190–210 at 100° C. for 3 hours. The resulting resin had a Barcol hardness of 43.

*Example IV*

3.89 parts of the liquid resulting from the mixing of 47 parts of m-phenylenediamine and 53 parts of N-methyl-o-phenylenediamine was used to cure 18.5 parts of epoxy resin having an epoxy equivalent of 190–210 for 3 hours at 100° C. The resulting resin had a Barcol hardness of 41.

*Example V*

3.95 parts of the liquid resulting from the mixing of 20 parts of a mixture of diaminonaphthalenes resulting from the reduction of dinitrated naphthalene and 80 parts of m-phenylenediamine was used to cure 18.5 parts of an epoxy resin having an equivalent of 190–210 for 3 hours at 100° C. The resulting resin had a Barcol hardness of 42.

*Example VI*

2.8 parts of the liquid resulting from the mixing of 68 parts of m-phenylenediamine and 32 parts of a mixture of toluenediamines resulting from the nitration and reduction of crude nitrotoluene was used to cure 18.5 parts of epoxy resin having an epoxide equivalent of 225–290 at 100° C. for 3 hours. The resulting resin had a Barcol hardness of 43.

*Example VII*

4.1 parts of N-n-butyl-o-phenylenediamine was used to cure 18.5 parts of an epoxy resin having an epoxy equivalent of 190–210 at 100° C. for 3 hours. The resulting resin had a Barcol hardness of 17.

It is to be noted that the curing temperature may vary from 75° to 210° C., depending upon the type of epon resin or resin formulation employed with the liquid catalyst. The proper curing temperature for the reaction of epon resins with heat convertible resins such as phenol-formaldehyde is readily determined by a few single trial experiments.

We claim:

1. A heat curing composition comprising a liquid glycidyl polyether of a dihydric phenol having an epoxide equivalent ranging from 140 to 290 in admixture with a curing amount of a liquid catalyst comprising 5 to 95 parts by weight of a phenylenediamine and 95 to 5 parts by weight of an aromatic diamine of the group consisting of toluenediamine, diaminonaphthalene and a N-alkyl phenylenediamine wherein the alkyl contains from 1 to 5 carbon atoms.

2. A heat curing composition according to claim 1 wherein the liquid catalyst comprises 5 to 85 parts by weight of a phenylenediamine and 85 to 5 parts by weight of a N-alkyl phenylenediamine wherein the alkyl contains from 1 to 5 carbon atoms.

3. A heat curing composition according to claim 1 wherein the liquid catalyst comprises 5 to 75 parts by weight of a toluenediamine and 95 to 25 parts by weight of a N-alkyl phenylenediamine wherein the alkyl contains from 1 to 5 carbon atoms.

4. A heat curing composition according to claim 1 wherein the liquid catalyst comprises 50 to 85 parts by weight of a phenylenediamine and 50 to 15 parts by weight of a diaminonaphthalene.

5. A heat curing composition according to claim 1 wherein the liquid catalyst comprises 35 to 75 parts by weight of a phenylenediamine and 65 to 25 parts by weight of a mixture of diaminonaphthalenes.

6. A heat curing composition according to claim 1 wherein the liquid catalyst comprises 35 to 85 parts by weight of a phenylenediamine and 65 to 15 parts by weight of a mixture of toluenediamines.

7. A process of hardening into an infusible state a liquid glycidyl polyether of a dihydric phenol having an epoxide equivalent ranging from 140 to 290 which comprises mixing in a curing amount in said liquid glycidyl polyether a liquid catalyst comprising 5 to 95 parts by weight of a phenylenediamine and 95 to 5 parts by weight of an aromatic diamine of the group consisting of toluenediamine, diaminonaphthalene and a N-alkyl phenylenediamine wherein the alkyl contains from 1 to 5 carbon atoms, and heating the mixture to a temperature ranging from 75° C. to 210° C.

8. A process according to claim 7 wherein the liquid catalyst comprises 5 to 85 parts by weight of a phenylenediamine and 95 to 15 parts by weight of a N-alkyl phenylenediamine wherein the alkyl contains from 1 to 5 carbon atoms.

9. A process according to claim 7 wherein the liquid catalyst comprises 5 to 75 parts by weight of a toluenediamine and 95 to 25 parts by weight of a N-alkyl phenylenediamine wherein the alkyl contains from 1 to 5 carbon atoms.

10. A process according to claim 7 wherein the liquid catalyst comprises 50 to 85 parts by weight of a phenylenediamine and 50 to 15 parts by weight of a diaminonaphthalene.

11. A process according to claim 7 wherein the liquid catalyst comprises 35 to 75 parts by weight of a phenylenediamine and 65 to 25 parts by weight of a mixture of diaminonaphthalenes.

12. A process according to claim 7 wherein the liquid catalyst comprises 35 to 85 parts by weight of a phenylenediamine and 65 to 15 parts by weight of a mixture of toluenediamines.

References Cited in the file of this patent

UNITED STATES PATENTS

| | | |
|---|---|---|
| 2,682,490 | Gams et al. | June 29, 1954 |
| 2,712,535 | Fisch | July 5, 1955 |

FOREIGN PATENTS

| | | |
|---|---|---|
| 133,819 | Australia | July 13, 1945 |